United States Patent [19]

Fabris et al.

[11] 4,239,879

[45] Dec. 16, 1980

[54] THERMOPLASTIC POLYURETHANE PREPARED FROM A POLY-1,2-PROPYLENE ETHER GLYCOL, A LOW MOLECULAR WEIGHT GLYCOL AND 2,4-TOLYLENE DIISOCYANATE

[75] Inventors: Hubert J. Fabris; Robert J. Herold, both of Akron; Arden E. Schmucker, Alliance, all of Ohio

[73] Assignee: The General Tire & Rubber Company, Akron, Ohio

[21] Appl. No.: 51,788

[22] Filed: Jun. 25, 1979

[51] Int. Cl.³ .............................................. C08G 18/48
[52] U.S. Cl. ...................................................... 528/76
[58] Field of Search ........................................... 528/76

[56] References Cited

U.S. PATENT DOCUMENTS

| | | | |
|---|---|---|---|
| 3,356,650 | 12/1967 | McElroy | 528/76 |
| 3,427,256 | 2/1969 | Milgrom | 526/113 |
| 3,525,717 | 8/1970 | Butler et al. | 528/76 |
| 3,829,505 | 8/1974 | Herold | 252/51 |
| 3,901,852 | 8/1975 | Shah | 528/76 |
| 3,925,319 | 12/1975 | Hiatt et al. | 528/76 |
| 4,098,772 | 7/1978 | Bonk et al. | 528/76 |
| 4,124,572 | 11/1978 | Mso | 528/76 |
| 4,169,196 | 9/1979 | Ehrlick et al. | 528/76 |

*Primary Examiner*—Maurice J. Welsh

[57] ABSTRACT

A thermoplastic, linear and segmented poly-1,2-propylene ether urethane having a Tg of below about −30° C. for the poly-1,2-propylene ether segments is made by reacting poly-1,2-propylene glycol having a high molecular weight; ethylene glycol, 2,3-butane diol or neopentyl glycol or mixture thereof; and 2,4-tolylene diisocyanate containing from about 55 to 100% by weight of the 2,4-isomer with the balance being the 2,6-isomer.

5 Claims, No Drawings

THERMOPLASTIC POLYURETHANE PREPARED FROM A POLY-1,2-PROPYLENE ETHER GLYCOL, A LOW MOLECULAR WEIGHT GLYCOL AND 2,4-TOLYLENE DIISOCYANATE

This invention relates to thermoplastic, linear and segmented polypropylene ether urethanes.

BACKGROUND

During the last two decades, thermoplastic polyurethanes have gained increasing attention. The materials combine the excellent properties of urethanes with the processing convenience of thermoplastic materials. Thermoplastic polyurethanes are generally of the $(AB)_n$ type, where flexible polyester or polyether segments (A) alternate with high melting polyurethane blocks (B).

Polyesterglycols (e.g., poly-1,4-butyleneadipate or polycaprolactone) or polytetramethylene ether glycols are commonly used as the flexible segments, while low molecular weight glycols (e.g., 1,4-butanediol or ethylene glycol) are most often chosen for the in situ formation of the rigid blocks of the alternating copolymer. A great variety of diisocyanates can be utilized in the preparation of these polymers, however, for reasons of commercial availability and polymer performance, 4,4'-diphenyl methane diisocyanate (MDI) has been widely preferred.

Polyesterurethanes have the disadvantage of inherent hydrolytic sensitivity, while polytetrahydrofuran type materials are of relatively high cost.

Linear urethane polymers of the above type based on low cost polypropylene ether glycols have not been prepared with satisfactory properties due to the fact that about the maximum molecular weight of commercially available polypropylene glycols made with alkali catalysts is about 3,000 for average functionality approaching 2. Even at this 3,000 M.W. limit for the polypropylene ether glycol the loss in end group functionality (—OH groups) becomes too large, causing low weights in the resulting linear polyurethane.

Accordingly, it is an object of the present invention to overcome the difficulties alluded to hereinabove and provide a method for making a thermoplastic linear polyurethane from polypropylene ether glycol having improved properties. These and other objects and advantages of the present invention will become more apparent to those skilled in the art from the following detailed description and working examples.

SUMMARY OF THE INVENTION

According to the present invention it has been discovered that thermoplastic, linear and segmented polyurethanes can be made by reacting poly-1,2-propylene ether glycol having an average molecular weight of from 3,300 to 14,000; ethylene glycol, 2,3-butanediol and/or neopentyl glycol; and 2,4-tolylene diisocyanate or a mixture containing at least about 55% by weight of 2,4-tolylene diisocyanate and the balance 2,6-tolylene diisocyanate in an equivalent ratio of the diisocyanate to the glycols of from about 0.98:1 to 1.08:1, the weight ratio of the urethane segments (tolylene diisocyanate plus ethylene glycol, 2,3-butanediol and/or neopentyl glycol) to poly-1,2-propylene ether segments being from about 0.4:1.0 to 1.5:1.0. The resulting polyurethanes exhibit a modulus at 100% elongation of at least about 400 p.s.i. and show for their polypropylene ether segments glass transition temperatures of below about −30° C. The poly-1,2-propylene ether glycol is made by reacting propylene oxide with an aliphatic low molecular weight glycol, e.g., diol, telogen in the presence of a catalyst of the double metal cyanide complex class.

DISCUSSION OF DETAILS AND PREFERRED EMBODIMENTS

The poly-1,2-propylene ether glycol used in the practice of the present invention is made by the polymerization (or telomerization) of propylene oxide in the presence of a telogen, a low molecular weight aliphatic glycol, using as a polymerization or telomerization catalyst a double metal cyanide complex compound according to the teaching of U.S. Pat. No. 3,829,505. Examples of low molecular weight glycols to use as telogens are aliphatic glycols like glycol; 1,2-propylene glycol; 1,3-propylene glycol; 1,4-butane diol; 2,3-butanediol; diethylene glycol; dipropylene glycol; 1,5-pentanediol; neopentyl glycol; 1,6-hexane diol and the like and mixtures of the same. The polymerization may be conducted in bulk or solvent. Solvent may be required when the propylene oxide and telogen are not miscible or soluble in order to facilitate polymerization. Polymerization is conducted to obtain an average molecular weight of from 3,300 to 14,000. A feature of the use of the double metal cyanide complex catalyst is the ability to get high molecular weights with propylene oxide in contrast to the limiting value of 3,000 when alkali catalysts are used. Furthermore, with the double metal cyanide complex catalyst higher functionality is obtained or maintained as compared to alkali catalysts. In other words, alkali catalysts show a limit in molecular weight with a substantial loss in functionality at the upper limiting molecular weights. On the other hand, using the double metal cyanide complex catalyst one is able to obtain functionality of about 2 at even very high molecular weights.

Catalysts of the double-metal cyanide complex class are well known. Methods for making these catalysts are disclosed by U.S. Pat. Nos. 3,427,256; 3,427,334 and 3,427,335. Methods for making polyalkylene ether glycols with these double metal cyanide catalysts having a high molecular weight, having a high hydroxyl functionality and having low unsaturation are shown by U.S. Pat. Nos. 3,829,505 and 3,941,849 (a division).

Ethylene glycol, 2,3-butanediol and/or neopentyl glycol used in the practice of the present invention are well known compounds.

Likewise, 2,4-tolylene diisocyanate is well known as well as mixtures of 80% by weight of 2,4-tolylene diisocyanate and 20% by weight of 2,6-tolylene diisocyanate (known as 80/20 2,4-/2,6-TDI). Also known is another mixture of 65/35 2,4-/2,6- tolylene diisocyanate. The diisocyanate is used in the practice of the invention in a range of from about 55 to 100% by weight of 2,4-tolylene diisocyanate with the balance being 2,6-tolylene diisocyanate.

The polyurethane may be made by the prepolymer process or the one-shot process in bulk or in the presence of a solvent. Catalysts such as tin catalysts may be used as well as antioxidants or other antidegradants. The urethane polymer may be prepared under nitrogen or under conditions to exclude water for best results. For more information on making polyurethanes see "Polyurethanes Chemistry and Technology," Part II, Technology, Saunders and Frisch, Interscience Publishers, a division of John Wiley & Sons, New York, 1964.

The thermoplastic polyether urethanes made by the process of the present invention are soluble and can be cast from solution or can be processed on plastic processing equipment. Alternatively, these polyurethanes can be formed in a mold by a casting or injection molding process directly from their liquid precursors. They are useful for the production of decorative and protective coatings, shoe soles and heels, sight shields for automobiles, energy absorbing bumpers and other automotive items. They may be mixed with the usual compounding ingredients like fillers and pigments and so forth.

The following examples will serve to illustrate the present invention with more particularity to those skilled in the art. Parts are parts by weight unless otherwise indicated.

EXAMPLE I

A thermoplastic polyether urethane was prepared by reacting together in 500 g. of dimethyl formamide, at 50° C., 59 g. of poly-1,2-propylene ether glycol (A) having an average molecular weight of 5210, 31.2 g. of 80/20% by weight 2,4-/2,6-tolylene diisocyanate and 9.92 g. of ethanediol in the presence of 3 g. of stannous octoate as a catalyst and 1 g. of "Ionol" (antioxidant, Shell Chem. Co., 2,6-di-tertiary butyl-4-methyl phenol) until a film cast on a NaCl crystal showed no absorption at 4.4 microns for free-NCO. The resulting polymer was precipitated in water and washed free of dimethyl formamide in a Waring blender. The resulting polyurethane had an inherent viscosity of 0.7 dl/g. in dimethyl formamide. A pressed sheet had 744 p.s.i. modulus (100% elongation), 1667 p.s.i. tensile strength, 310% elongation, Graves tear strength of 219 pounds per linear inch and a dynamic modulus transition temperature or, $Tg^*$, of $-48°$ C. for the polypropylene ether segments of the urethane polymer. The weight ratio of urethane segments (NCO+low M.W. diol) to polyether segments (high M.W. diol) was 0.70:1.

EXAMPLE II

The procedure of Example I was repeated except that 1,4-dioxane was used as a solvent. The ingredients of the polyurethane were prepared from 59.2 g. of poly-1,2-propylene ether glycol (A) having an av. M.W. of 3360, 10.1 g. of ethane diol and 33 g. of 80/20% by weight 2,41-/2,6-tolylene diisocyanate. The resulting polyether urethane had an inherent viscosity (in dimethyl formamide) of 0.4 dl/g., a 100% modulus of 830, a tensile strength of 3090 p.s.i., an elongation of 770%, a Graves tear strength of 426 pounds per linear inch and a glass transition temperature ($Tg^*$) of $-33°$ C. for the polypropylene ether segments of the polyurethane. In the resulting polyurethane the weight ratio of urethane segments (NCO+low M.W. diol) to polyether segments (high M.W. diol) was 0.73:1.

EXAMPLE III

The procedure of Example I was repeated except that 1,4-dioxane was used as a solvent. The ingredients of the polyurethane were prepared from 59 g. of poly-1,2-propylene ether glycol (A) having an av. M.W. of 2450, 9.2 g. of ethane diol and 33 g. of 80/20% by weight 2,4-/2,6-tolylene diisocyanate. The resulting polyether urethane had an inherent viscosity (in dimethyl formamide) of 0.35 dl/g., a 100% modulus of 460, a tensile strength of 2180 p.s.i., an elongation of 800%, a Graves tear strength of 305 pounds per linear inch and a glass transition temperature ($Tg^*$) of $-6°$ C. for the polypropylene ether segments of the polyurethane. In the resulting polyurethane, the weight ratio of urethane segments (NCO+low M.W. diol) to polyether segment was 0.71:1.

EXAMPLE IV

The method of this example was the same as that of Example II using 50. g. of poly-1,2-propylene ether glycol (A) of av. M.W. 5210, 13.9 g. 2,3-butanediol and 30.7 g. 80/20% by weight 2,4-/2,6-tolylene diisocyanate in the presence of 5 g. of stannous octoate and 1.0 g. of "Ionol." The resulting polymer had an inherent viscosity in dimethyl formamide of 0.4 dl/g and a dynamic modulus transition temperature or $Tg^*$ of $-43°$ C. for the polypropylene ether segments of the polyurethane. In the resulting polyurethane the weight ratio of urethane segments (NCO+low M.W. diol) to polyether segments was 0.89:1. The polyurethane had a 100% modulus of 749 p.s.i.

A polyurethane was prepared in the same way from the same 5210 M.W. polypropylene ether glycol (50 g.), 2,3-butanediol (10.8 g.) and MDI (34 g.). The resulting polyurethane had a 100% modulus of 764 p.s.i., an inherent viscosity of 0.55 dl/g. but a $Tg^*$ of $+33°$ C. The weight ratio of urethane segments to polypropylene ether segments was 0.9:1.

EXAMPLE V

A polyurethane polymer was prepared according to the method of Example II from 50 g. of poly-1,2-propylene ether glycol (A) having an av. M.W. of 5210, 15 g. of neopentyl glycol and 29 g. of 80/20% by weight 2,4-/2,6-tolylene diisocyanate in the presence of 5 g. of stannous octoate. The resulting polymer exhibited a glass transition temperature, $Tg^*$, of $-53°$ C. for the polypropylene ether segments of the polyurethane, 100% modulus of 432 p.s.i. and tensile strength of 569 p.s.i. The weight ratio of urethane segments to polypropylene ether segments was 0.88:1.

The polyurethane was prepared in the same way from the same 5210 M.W. polypropylene ether glycol (50 g.), 13.9 g. of neopentyl glycol and 35.2 g. of MDI. The resulting polymer had a 100% modulus of 642 p.s.i., an inherent viscosity of 0.6 dl/g. but a $Tg^*$ of 15° C. The weight ratio of urethane segments to polypropylene ether segments was 0.98:1.

EXAMPLE VI

Poly-1,2-propylene ether glycol (B) of $\overline{M.W.}$ 1000 ("Niax" PPG 1025, Union Carbide) was dried on a Flash Evaporator at 85° C./2 mm Hg. for one hour. The vacuum was released with nitrogen and 80/20% by weight 2,4-/2,6- TDI (33.8 g.) and 1,4-dioxane (100 g.) were added to the hot polyol. Rotation of the reaction flask was continued in the temperature bath (85° C.) under atmospheric pressure for two hours. Ninety-five percent of this prepolymer was then added to a solution of 7.5 g. ethylene glycol and 5 g. of stannous octoate catalyst in 500 ml dimethyl formamide in a stirred glass reactor under $N_2$. After one hour at 70° C., the remainder of the prepolymer was added in small increments over 24 hours until the solution assumed a viscous oily appearance. The polymer obtained after evaporation of the solvent had a glass transition temperature, $Tg^*$, of $+32°$ C. for the polypropylene ether segments of the polyurethane. The modulus at 100% elongation was 330 p.s.i. The weight ratio of the urethane segments to the polyether segments was 0.71:1.

The following Table I briefly summarizes the above

Several polypropylene ether urethanes were prepared in this fashion. The ingredients of the polypropylene ether urethanes, and the results obtained for the polyurethanes are shown in Table II below:

TABLE II

| Run | 80/20 2,4-/2,6- TD$_I$ grams | Ethylene glycol, grams | Poly-1,2-propylene ether glycol (A), grams | Average molecular weight of polypropylene ether glycol (A) | Wt. ratio urethane to polyether # | Tg*, °C. | Polyurethane Inh. Visc., DMF, dl/g. | 100% Modulus, p.s.i. | Tensile strength, p.s.i. | Elongation, % | Tear, Graves, p/l.i. | Shore A Hardness |
|---|---|---|---|---|---|---|---|---|---|---|---|---|
| A | 26.8 | 8.05 | 103.2 | 4,600 | 0.335:1 | −60 | 0.64 | 200 | 1070 | 1010 | 278 | 56 |
| B | 37.5 | 12.1 | 91.6 | 4,600 | 0.54:1 | −61 | 0.74 | 400 | 2550 | 920 | 353 | 65 |
| C | 50.7 | 16.6 | 98.4 | 4,600 | 0.70:1 | −60.5 | 0.41 | 600 | 2740 | 800 | 338 | 73 |
| D | 68.6 | 23.5 | 60.8 | 4,600 | 1.50:1 | −60 | 0.41 | 1120 | 1610 | 160 | 153 | 82 |
| E | 33.7 | 10.8 | 65.7 | 11,800 | 0.70:1 | −54 | 0.73 | 1173 | 2720 | 290 | 333 | 62 |

Notes for the above examples:
(A) - Poly-1,2-propylene ether glycol prepared according to the teachings of U.S. Pat. No. 3,829,505 from propylene oxide and a glycol using a double-metal cyanide complex class catalyst.
(B) - Commercial polypropylene ether glycol.
* - The glass transition temperatures of the poly-1,2-propylene ether segments of the polyurethanes were obtained from the maximum of the damping temperature curve determined on a vibrating beam dynamic testing apparatus.
- Weight ratio of urethane segments (TDI or MDI + low M.W. glycol) to poly-1,2-propylene ether segments.
- MDI used instead of TDI.

Examples I to VI:

TABLE I

| Example | 100% Modulus, p.s.i. | Tg*, °C. | Low M.W. Glycol | Av. M.W. of Polypropylene Ether Glycol | Wt. Ratio Urethane/ Polyether# |
|---|---|---|---|---|---|
| I | 744 | −48 | Ethylene | 5,210 | 0.70:1 |
| II | 830 | −33 | " | 3,360 | 0.73:1 |
| III | 460 | −6 | " | 2,450 | 0.71:1 |
| IV | 749 | −43 | 2,3-butane | 5,210 | 0.89:1 |
|  | 764 | +33 | 2,3-butane | 5,210 | 0.9:1## |
| V | 432 | −53 | Neopentyl | 5,210 | 0.88:1 |
|  | 642 | +15 | Neopentyl | 5,210 | 0.98:1## |
| VI | 330 | +32 | Ethylene | 1,000 | 0.71:1 |

EXAMPLE VII

Poly-1,2-propylene ether glycol (A) and an antioxidant were dried in a flask on a Flash Evaporator at 100° C. and at 2 mm. Hg. for one hour. The vacuum was released with nitrogen, and the glycol was allowed to cool to about 60° C. before adding tolylene diisocyanate and a small amount of dibutyl tin dilaurate catalyst with mixing. Rotation of the flask was continued in a temperature bath (100° C.) under reduced pressure for two hours, and then the flask contents were allowed to cool under nitrogen. The resulting prepolymer and dry ethylene glycol were homogenized by stirring for approximately one minute before additional dibutyl tin dilaurate catalyst was added. After stirring, the mixture was evacuated to break any bubbles and poured into a gravity, tensile sheet mold at about 100° C. The mold consisted of "Teflon" (fluorocarbon resin, duPont) coated ⅜" steel side plates with ⅛" spacers of "Teflon" to give a mold cavity of 8"×8"×⅛". After curing overnight at 110° C., the sample was removed from the mold and postcured for about six hours at the same temperature.

We claim:

1. A thermoplastic, linear and segmented poly-1,2-propylene ether urethane consisting essentially of the reaction product of (1) tolylene diisocyanate comprising from about 55% to 100% by weight of 2,4-tolylene diisocyanate and the balance 2,6-tolylene diisocyanate, (2) a glycol selected from the group consisting of ethylene glycol, 2,3-butane diol and neopentyl glycol and mixtures thereof and (3) a poly-1,2-propylene ether glycol having an average molecular weight of from 3,300 to 14,000, the equivalent ratio of the diisocyanate to the glycols being from about 0.98 to 1.08:1, the weight ratio of the urethane segments (tolylene diisocyanate plus ethylene glycol, 2,3-butane diol and/or neopentyl glycol) to poly-1,2-propylene ether segments being from about 0.4:1.0 to 1.5:1.0, the glass transition temperature of the poly-1,2-propylene ether segments of the polyurethane being below about −30° C., the poly-1,2-propylene ether glycol having been made by the reaction of propylene oxide with a low molecular weight aliphatic glycol using a polymerization catalyst of the double metal cyanide complex class and the polyurethane having a 100% modulus of at least about 400 p.s.i.

2. A poly-1,2-propylene ether urethane according to claim 1 where said aromatic diisocyanate is an 80/20 percent by weight mixture of 2,4- and 2,6-tolylene diisocyanates.

3. A poly-1,2-propylene ether urethane according to claim 2 where (2) is ethylene glycol.

4. A poly-1,2-propylene ether urethane according to claim 2 where (2) is 2,3-butane diol.

5. A poly-1,2-propylene ether urethane according to claim 2 where (2) is neopentyl glycol.

* * * * *